US011386037B2

(12) United States Patent
Ardichvili et al.

(10) Patent No.: US 11,386,037 B2
(45) Date of Patent: Jul. 12, 2022

(54) MANAGEMENT OF ACCESS RESTRICTION WITHIN A SYSTEM ON CHIP (71) Applicant: STMicroelectronics (Rousset) SAS, Rousset (FR)

(72) Inventors: Emmanuel Ardichvili, Valbonne (FR); Laurent Lestringand, Antibes (FR); Patrick Valdenaire, Roquefort les Pins (FR)

(73) Assignee: STMicroelectronics (Rousset) SAS, Rousset (FR)

(*) Notice: Subject to any disclaimer, the term of this patent is extended or adjusted under 35 U.S.C. 154(b) by 456 days.

(21) Appl. No.: 16/684,296

(22) Filed: Nov. 14, 2019

(65) Prior Publication Data

US 2020/0174964 A1 Jun. 4, 2020

(30) Foreign Application Priority Data

Nov. 29, 2018 (FR) ...................... 1872038

(51) Int. Cl.
*G06F 15/78* (2006.01)
*G06F 15/173* (2006.01)
(Continued)

(52) U.S. Cl.
CPC .... *G06F 15/7807* (2013.01); *G06F 15/17381* (2013.01); *G06F 21/62* (2013.01); *G06F 13/14* (2013.01)

(58) Field of Classification Search
CPC .............. G06F 13/14; G06F 15/17381; G06F 15/7807; G06F 21/62
See application file for complete search history.

(56) References Cited

U.S. PATENT DOCUMENTS

2012/0079590 A1  3/2012  Sastry et al.
2016/0004656 A1* 1/2016  Arbel ................. G06F 12/1441
                                              710/110
(Continued)

FOREIGN PATENT DOCUMENTS

GB         2548387 A       9/2017
WO      2014135591 A1     9/2014

OTHER PUBLICATIONS

ARM, "AMBA® 3 AHB-Lite Protocol Specification", ARM IHI 0033A, v1.0, www.arm.com, Jun. 2006, 72 pages.

(Continued)

*Primary Examiner* — Terrell S Johnson
(74) *Attorney, Agent, or Firm* — Slater Matsil, LLP (57) ABSTRACT A system includes a plurality of items of master equipment, each having a programing interface, and a plurality of slave equipment. An interconnect circuit is coupled between the items of master equipment and the items of slave equipment. Each transaction is assigned an attribute capable of taking on at least two attribute values corresponding to at least two states for the master equipment. Each item of slave equipment is associated with an identifier capable of taking on at least two values corresponding respectively to at least two properties for the slave equipment. Each item of master equipment automatically inherits the property of its programing interface. A filtering circuit is configured to, in the presence of a transaction intended for an item of slave equipment, compare the corresponding attribute value with an identifier value of the intended slave equipment and reject or not reject the transaction based on the comparison.

21 Claims, 4 Drawing Sheets (51) Int. Cl.
*G06F 21/62* (2013.01)
*G06F 13/14* (2006.01)

(56) References Cited

U.S. PATENT DOCUMENTS

| | | | |
|---|---|---|---|
| 2016/0238654 A1* | 8/2016 | Stoll | G01R 31/31707 |
| 2016/0350549 A1 | 12/2016 | Hampel et al. | |
| 2017/0185345 A1 | 6/2017 | Lim et al. | |
| 2017/0185539 A1 | 6/2017 | Xu et al. | |
| 2017/0272271 A1 | 9/2017 | Vari et al. | |
| 2018/0121125 A1 | 5/2018 | Zeng et al. | |

OTHER PUBLICATIONS

ARM, "ARM® CoreLink NIC-400 Network Interconnect," Revision: r0p3, Techinical Reference Manual, 2012-2014, 76 pages, ARM DDI 0475E (ID110314).

Gerstlauer, A., "EE382V: System-on-a-Chip (SoC) Design," Lecture 12—SoC Communication Architectures, 2014, pp. 1-43.

NXP, "i.MX 7Dual Applications Processor", Reference Manual, Document No. IMX7DRM, nxp.com, Rev. 1, Jan. 22, 2018, 5703 pages.

Rao, M. V., "A Frame work on AMBA bus based Communication Architecture to improve the Real Time Computing Performance in MPSoC", International Journal of Computer Applications, vol. 91, No. 5, Apr. 2014, pp. 1-5.

\* cited by examiner

MANAGEMENT OF ACCESS RESTRICTION WITHIN A SYSTEM ON CHIP

CROSS-REFERENCE TO RELATED APPLICATIONS

This application claims priority to French Patent Application No. 1872038, filed on Nov. 29, 2018, which application is hereby incorporated herein by reference.

TECHNICAL FIELD

The present disclosure relates generally to an electronic system and method, and, in particular embodiments, to management of access restriction within a system-on-chip (SoC).

BACKGROUND

To contribute to ensuring the reliability of a system-on-chip, access by one or more items of master equipment to specific resources (slave equipment) may be required to be restricted. Such a characteristic is commonly referred to by the person skilled in the art as "isolation."

The management of these access restrictions is usually complex to implement, in particular when this management is dynamic.

SUMMARY

Some embodiments make management of access restriction simple to set up and implement. In particular, some embodiments make manage of access restriction simple to setup and implement for the case in which this management is dynamic (e.g., when it depends on the application considered for the system-on-chip).

Some embodiments relate to the routing of transactions between items of master equipment and items of slave equipment within a system-on-chip (SoC). In some embodiments, the system-on-chip is, for example, a microcontroller.

Some embodiments relate to the management of access restrictions to certain items of slave equipment.

In some embodiments, a system-on-chip includes a set of master equipment. The set of master equipment may include, for example, one or more processors, a direct memory access (DMA) controller, etc.

In some embodiments, some items of master equipment of the set of master equipment have a corresponding programing interface. An item of master equipment having a programing interface is hereafter in the text referred to as an item of "first master equipment."

The set of master equipment may also include one or more items of master equipment lacking a programing interface. An item of master equipment lacking a programing interface is hereafter in the text referred to as an item of "second master equipment," in order to differentiate it from an item of first master equipment. In some embodiments, an item of second master equipment may be, for example, a processor.

The system-on-chip moreover comprises several items of slave equipment. The programing interfaces of the items of first master equipment are considered items of slave equipment. The slave interfaces of specific equipment such as, for example, memories or peripheral devices or more generally resources, are also considered to be items of slave equipment. The slave interfaces of specific equipment are different from programing interfaces of the items of first master equipment.

The system-on-chip moreover includes an interconnect circuit (known to the person skilled in the art as "interconnect") coupled between the set of master equipment and the slave interfaces of specific equipment of the items of slave equipment.

Each item of master equipment is configured to transmit transactions (for example, write transactions or read transactions) to at least one of the slave interfaces of specific equipment of the items of slave equipment.

Each transaction transmitted by an item of first master equipment is assigned an attribute capable of taking on at least two attribute values corresponding to at least two desired states for this first master equipment.

As regards to the at least one item of second master equipment lacking a programing interface, the at least one item of second master equipment is also connected to the interconnect circuit. The at least one item of second master equipment is configured to grant to the attribute of its transactions a fixed value taken from among the at least two attribute values and corresponding, for this second item of master equipment, to one of the desired states.

This fixed attribute value is, for example, hard-coded in the item of second master equipment thereby giving it a de facto a fixed state.

Each item of slave equipment is associated with an identifier (for example, a word of one or more bits) capable of taking on at least two values corresponding respectively to at least two desired properties for the item of slave equipment. A first desired property for an item of slave equipment can be, for example, the fact that it can be accessed only by one or more authorized items of master equipment taken from among the set of master equipment. A second desired property for this item of slave equipment can be, for example, the fact that it can be accessed by any item of master equipment of the set of master equipment.

In other words, an item of slave equipment having the first property is hence referred to as "isolated," whereas it is referred to as "non-isolated" if it has the second property.

In such a case, the two properties are complementary to one another (i.e., an item of slave equipment cannot have both properties simultaneously nor possess none of them). The two values of the identifier corresponding to these two properties are hence, for example, simply the two logic values of a bit.

As for an item of master equipment of the set of master equipment, whether it be an item of first or second master equipment, a first desired state for this item of master equipment is, e.g., the fact that it is authorized to access any slave equipment. A second desired state for this item of master equipment is, e.g., the fact that it is not authorized to access one or more items of slave equipment selected from among the set of slave equipment.

In other words, an item of master equipment having the first state can access any slave equipment, for example, regardless of whether the slave equipment is "isolated" or "non-isolated." Conversely, an item of master equipment having the second state cannot for example access "isolated" items of slave equipment.

Moreover, in some embodiments, each item of first master equipment automatically inherits the property of its programing interface (which is considered, as indicated previously, as being an item of slave equipment) and is configured to grant to the attribute of its transactions one of the values of the attribute according to the value of the identifier of its programing interface.

The system-on-chip moreover includes a filtering circuit configured to, in the presence of a transaction intended for an item of slave equipment, compare the corresponding attribute value with the slave value of the slave identifier of this item of slave equipment and reject or not reject the transaction according to the result of the comparison.

In some embodiments, the fact that each item of first master equipment automatically inherits the property of its programing interface and that it grants to the attribute of its transactions one of the values of the attribute according to the value of the identifier of its programing interface advantageously greatly simplifies the management of access restrictions and hardware implementation.

Thus, if the programing interface of an item of first master equipment is considered to be "isolated," then this item of first master equipment is automatically isolated (i.e., it will be able to have access not only to the isolated items of slave equipment but also to those which are not isolated).

If, on the other hand, the programing interface of an item of first master equipment is considered to be "non-isolated," then this first master equipment is automatically non-isolated (i.e., it will not be able to have access to isolated items of slave equipment).

It is therefore not necessary in particular to provide for an external signal dedicated to making the item of first master equipment isolated or non-isolated.

Consequently, the item of first master equipment defines the value of the attribute of its transactions according to the value of the identifier of its programing interface, thereby avoiding, in this case too, the use of a specific external signal to define the attribute value.

While the values of the identifiers of the items of slave equipment can be fixed in registers of the system-on-chip, it is particularly advantageous in certain applications to be able to program these values for at least certain items of slave equipment.

As indicated previously, the items of slave equipment include the programing interfaces and slave interfaces of specific equipment, such as memories, peripheral devices or more generally resources.

According to one embodiment, the value of the identifier of at least one of the slave interfaces as well as the value of the identifier of at least one of the programing interfaces are advantageously programmable.

Moreover, the system additionally includes a programing circuit configured to program the programmable identifier values via the interconnect circuit.

By way of non-limiting example, the programing circuit can include at least one first programmable register associated with the at least one of the programing interfaces and intended to contain the value of the identifier associated with this programing interface, at least one second programmable register associated with the at least one of the items of specific equipment and intended to contain the value of the identifier associated with this specific item of equipment, a programing block, for example a hardware state machine or most often instructions of an initialization code, configured to program the at least one first programmable register and the at least one second programmable register via the interconnect circuit, and a connection link, for example one or more "wires" according to the size of the identifier, between the at least one first programmable register and the said at least one of the programing interfaces.

In some embodiments, this "wired" connection is particularly simple to produce, thereby easily making the dynamic management of access restrictions simple to produce.

Moreover, in some embodiments, it is particularly advantageous that this connection link extends into the item of first master equipment associated with the at least one of the programing interfaces.

Thus, the control logic of the programing interface of this item of first master equipment can directly read the content of the first programmable register so as to know the value of the identifier associated with this programing interface and, thus, determine whether it has, e.g., an isolated or non-isolated character so as to reject, e.g., transactions which would come from an item of master equipment which could not have access to isolated items of slave equipment.

Likewise, the item of first master equipment directly receives the value of the identifier associated with its programing interface and can therefore allocate de facto an attribute value which corresponds to such an identifier.

In other words, if the programing interface is isolated, this item of first master equipment will automatically inherit the fact of having, for example, access to any slave equipment, isolated or non-isolated.

The one or more items of second master equipment, for example a microprocessor, can perform the programing of the programmable register or registers. In other words, the one or more items of second master equipment can incorporate the programing block.

The programing circuit is for example configured to perform the programing during an initialization phase of the system.

According to one embodiment, the interconnect circuit includes an interconnect matrix connected to the set of master equipment and to at least one stage including at least one demultiplexer having an input connected to an output of the interconnect matrix and several outputs connected to the said slave interfaces.

The filtering circuit hence includes a filtering logic located in the stage, connected to the at least one second programmable register and configured to compare the value of the attribute of a transaction intended for one of the slave interfaces with the value of the identifier of this slave interface.

As indicated above, in some embodiments, a first desired property for an item of slave equipment is the fact that it can be accessed only by one or more authorized items of master equipment taken from among the set of master equipment, and a second desired property for this slave equipment is the fact that it can be accessed by any master equipment of the set of master equipment.

Likewise, in some embodiments, a first desired state for an item of master equipment of the set of master equipment is the fact that it is authorized to access any slave equipment, and a second desired state for an item of master equipment of the set of master equipment is the fact that it is not authorized to access one or more items of slave equipment selected from among the set of slave equipment.

Thus, for example, when the identifier of a programing interface has a first value corresponding to the first property, the attribute of a transaction coming from the item of first master equipment associated with this programing interface has a first attribute value corresponding to the first state.

And, for example, when the identifier of a programing interface has a second value corresponding to the second property, the attribute of a transaction coming from the item of first master equipment associated with this programing interface has a second attribute value corresponding to the second state.

Thus, for example, a transaction assigned an attribute having the first attribute value can be intended for any slave equipment, and a transaction assigned an attribute having the second attribute value and intended for an item of slave equipment for which the identifier has the first value will be rejected.

BRIEF DESCRIPTION OF THE DRAWINGS

Other advantages and features of the invention will become clearer upon examining the detailed description of embodiments and implementations, which are not at all limiting, and the accompanying drawings in which.

DETAILED DESCRIPTION OF ILLUSTRATIVE EMBODIMENTS

Figure 1:
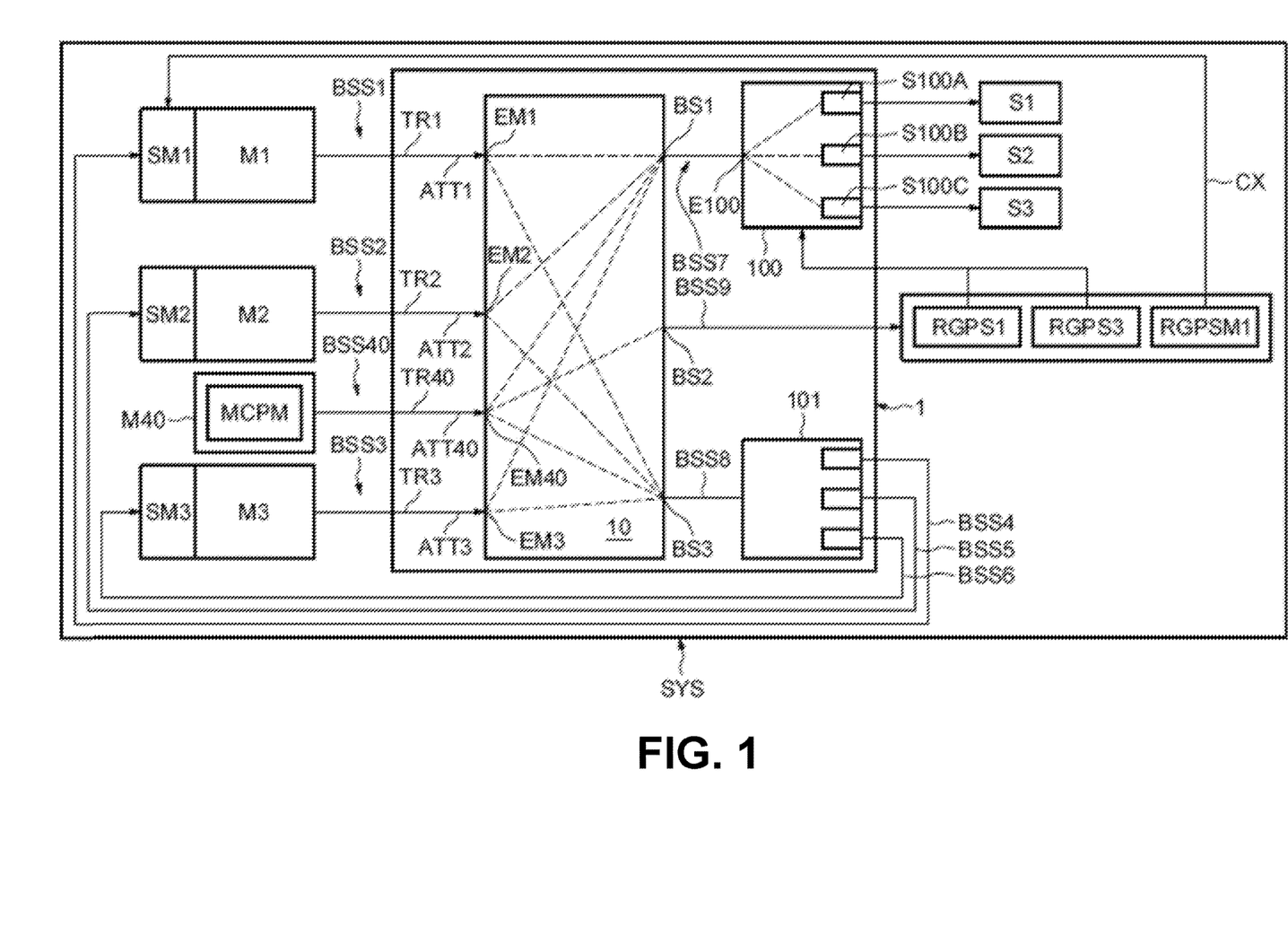
FIG. 1 schematically illustrates an embodiment of a system-on-chip, according to an embodiment of the present invention.

In FIG. 1, the reference SYS denotes a system-on-chip, for example a microcontroller, in this case including several items of first master equipment M1, M2, M3 each having a programing interface SM1, SM2, SM3. Each programing interface is intended to receive transactions intended for the corresponding item of first master equipment, with a view for example to programing it.

The system-on-chip SYS also includes one or more items of second master equipment lacking a programing interface. In this embodiment, the system-on-chip SYS only includes one item of second master equipment M40. This item of second master equipment is for example a microprocessor. In some embodiments, the system-on-chip SYS may include more than one item of second master equipment.

The system-on-chip SYS also includes several items of slave equipment, which includes the programing interfaces.

More specifically, the items of slave equipment include the programing interfaces SM1, SM2 and SM3 and also slave interfaces S1, S2, S3 of specific equipment, wherein the slave interfaces S1, S2, S3 are different from programing interfaces.

These items of specific equipment (e.g., S1, S2, S3) are generally resources, for example memories.

Each item of master equipment, whether it be an item of first master equipment or an item of second master equipment, is configured to transmit transactions to at least one of the items of slave equipment. In some embodiments, the master equipment transmits a transaction via a master interface which, for simplification, is not represented here. Such transactions can be, e.g., read transactions, write transactions, programing transactions, etc.

Each transaction TRi coming from an item of master equipment Mi is assigned an attribute ATTi.

This attribute is capable of taking on, in this example implementation, two attribute values corresponding to two desired states for the master equipment.

Likewise, each item of slave equipment, whether it be a programing interface or a slave interface, is associated with an identifier capable of taking on at least two values corresponding respectively to at least two desired properties for the item of slave equipment.

In this example embodiment and implementation, a first desired property for an item of slave equipment is the fact that it can be accessed only by one or more authorized items of master equipment taken from the set of master equipment.

In other words, such an item of slave equipment is hence referred to as "isolated" and it can be accessed only by one or more authorized master components. In this case, the identifier associated with this slave equipment will for example have the logic value "1."

A second desired property for an item of slave equipment is the fact that it can be accessed by any master equipment from the set of master equipment.

In other words, with this second property, the item of slave equipment is not "isolated." Its identifier hence has for example the logic value "0."

As regards to an item of master equipment, a first desired state for this master equipment can be the fact that it is authorized to access any slave equipment, i.e., an isolated or non-isolated item of slave equipment (programing interface or resource).

In that case, the attribute of the transactions coming from this item of master equipment can take for example the logic value "1."

A second desired state for an item of master equipment can be the fact that it is not authorized to access one or more items of slave equipment selected from among the set of slave equipment.

In other words, this item of master equipment will not for example be authorized to access an "isolated" item or items of slave equipment. In that case, the attribute associated with the transactions coming from such an item of master equipment in this second state will take for example the logic value "0."

Moreover, the state of each item of first master equipment is automatically inherited from the property of its programing interface.

In other words, in this example, if the programing interface of an item of first master equipment has the "isolated" property, then the item of first master equipment is in its first state authorizing it to access any slave equipment, whether this slave equipment is isolated or non-isolated.

If the programing interface of this item of first master equipment has the "non-isolated" property, then this item of first master equipment is automatically in its second state not authorizing it to access isolated slave equipment (programing interface or slave interface).

And, the item of first master equipment is then configured to grant to the attribute of these transactions one of the attribute values according to the value of the identifier of its programing interface.

As regards to an item of second master equipment, in an embodiment, the attribute value of these transactions is fixed, for example hard-coded, according to the state that the user desires to give to this item of second master equipment.

Thus in this example, the item of second master equipment M40 is in the first state authorizing it to access any slave equipment, whether this slave equipment is isolated or non-isolated.

For the case in which the system includes another item of second master equipment, the latter could for example be in the second state not authorizing it to access isolated slave equipment.

Moreover, as will be seen in more detail later, in this example, the values of certain identifiers are hard-coded in the system whereas others are programmable according to, for example, the application for which the system-on-chip is intended and/or the nature of the various resources.

The system-on-chip also includes a filtering circuit configured to, in the presence of a transaction intended for an item of slave equipment, compare the corresponding attribute value with the value of the identifier of this slave equipment and reject or not reject the transaction according to the result of the comparison.

As will be seen in more detail later, the filtering circuit includes various filtering logics.

The system-on-chip SYS also includes an interconnect circuit 1 coupled between the items of master equipment Mi and the items of slave equipment SMi, Si.

The interconnect circuit 1 includes an interconnect matrix 10 having several inputs EM1, EM2, EM3, EM40 connected to the items of master equipment M1, M2, M3, M40 via buses BSS1, BSS2, BSS3 and BSS40, and several outputs.

A first output BS1 is connected via a bus BSS7 to the input E100 of a first demultiplexing stage 100 in this case having three outputs S100A, S100B, S100C connected to the three slave interfaces S1, S2 and S3, respectively.

Another output BS3 is connected to another demultiplexing stage 101, in this case also having three outputs respectively connected to the three programing interfaces SM1, SM2, SM3 via three buses BSS4, BSS5 and BSS6.

A bus BSS8 connects the output BS3 of the interconnect matrix to the demultiplexing stage 101.

Lastly, in this example, another output BS2 of the interconnect matrix is connected to a bank of registers RGPS1, RGPS3, RGPSM1 via a bus BSS9.

As will be seen in more detail later, this output BS2 is accessible only by transactions coming from the item of second master equipment M40.

The structure of such an interconnect matrix, which is in general a multilayer interconnect matrix, as well as the protocol enabling the exchange and the routing of transactions within the interconnect matrix are well known to the person skilled in the art.

The person skilled in the art may for example refer in particular to: the article by Venkateswara Rao and others entitled "A Frame work on AMBA bus based Communication Architecture to improve the Real Time Computing Performance in MPSoC", International Journal of Computer Applications (0975-8887), Volume 91-No. 5, April 2014, or to: a general presentation about these interconnect matrices which was delivered in 2015 by A. Gerstlauer and available at http://users.ece.utexas.edu/~gerstl/ee382v_v14/lectures/lecture_12.pdf.

Moreover, by way of indication, but in a non-limiting manner, for example the interconnect matrix sold by the company ARM under the reference NIC-400 (version Rop3) can be used.

The various buses can for their part be of any conventional structure, and for example AHB buses using a protocol described for example in the document "AMBA 3 AHB-Lite Protocol V1.0 Specification," of the company ARM (2001, 2006).

The register RGPS1 is intended to contain the value of the identifier of the slave interface S1.

The register RGPS3 is intended to contain the identifier of the slave interface S3 while the register RGPSM1 is intended to contain the identifier of the programing interface SM1.

The values of registers RGPS1, RGPS3 and RGPSM1 are in this case programmable via the bus BSS9 by a programing circuit including a programing block MCPM in this case incorporated in the item of second master equipment M40 (processor), and the bank of registers RGPS1, RGPS3, RGPSM1.

This programing block MCPM is in this case a program initialization code intended to be executed during an initialization phase in order, notably, to program the contents of the bank of registers RGPS1, RGPS3, RGPSM1.

In some embodiments, the output BS2 of the interconnect matrix 10 is accessible only by the item of second master equipment M40 in order to receive the programing transactions.

Moreover, a connection CX, for example a conducting wire, connects the register RGPSM1 to the programing interface SM1.

It is also assumed in this example that the values of the identifiers of the slave interface S2 and of the programing interfaces SM2 and SM3 are fixed and hard-coded in registers.

Figure 2:
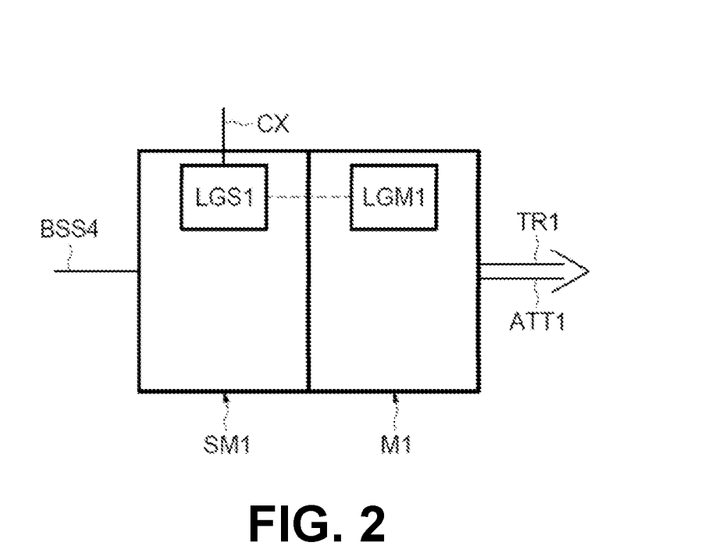
FIGS. 2-4 schematically illustrate parts of the system-on-chip of FIG. 1, according to an embodiment of the present invention.
Figure 3:
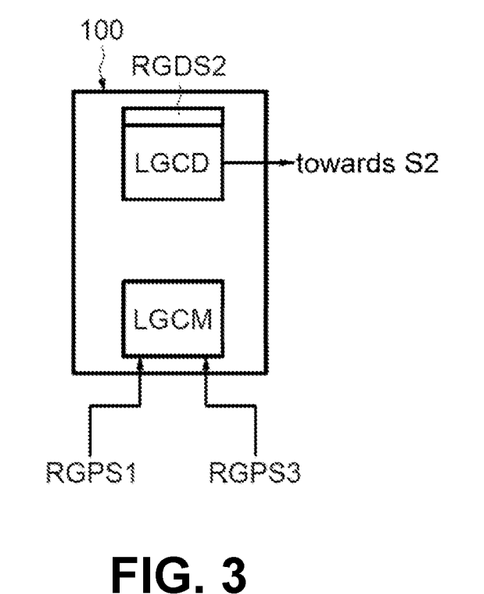
Figure 4:
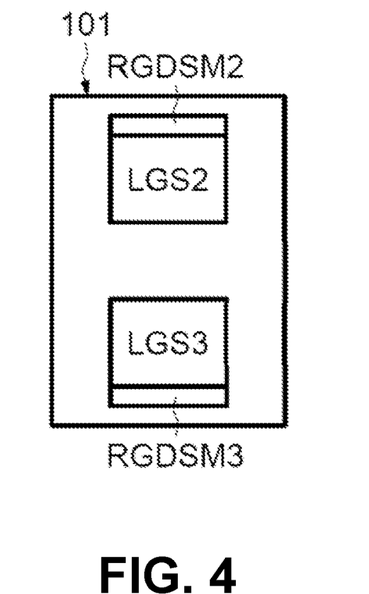

Reference will now be made more particularly to FIGS. 2 to 4 in order to illustrate in more detail, but still schematically, the internal structure of the programing interface SM1, the item of first master equipment M1 and the demultiplexing stages 100 and 101.

The interface SM1 includes a filtering logic LGS1 coupled to the connection CX.

This filtering logic LGS1 is configured to compare the value of the identifier of the interface SM1, which is read in the register RGPSM1 via the connection CX, with the attribute of a transaction arriving on the bus BSS4. The transaction may be rejected or authorized based on such comparison.

The connection CX extends into the item of first master equipment M1 and more specifically up to a logic LGM1. This logic LGM1 is configured to determine the value of the attribute ATT1 associated with each transaction TR1 delivered by the item of first master equipment M1 according to the value of the identifier of the programing interface SM1.

Thus, the state of the item of first master equipment is automatically inherited from the property of its programing interface.

More specifically, if for example the programing interface is an interface referred to as isolated, then the item of first master equipment will be an item of equipment authorized to access any slave equipment, whether this slave equipment is isolated or non-isolated.

If, on the other hand, the interface SM1 is a non-isolated interface, then the item of first master equipment Mi will automatically be in a state that does not allow it to access items of isolated slave equipment.

The demultiplexing stage 100 also includes a filtering logic LGCD coupled to a register RGDS2 storing in this example the identifier of the slave interface S2.

As indicated previously, in some embodiments this register RGDS2 is not programmable.

The filtering logic LGCD is therefore configured to compare the attribute of a transaction intended for the slave interface S2 with the identifier of this slave interface S2 stored in the register RGDS2.

The demultiplexing stage 100 includes another filtering logic LGCM coupled to the registers RGPS1 and RGPS3.

This filtering logic LGCM is intended to compare the value of the attribute of a transaction intended for the slave interface Si with the value of the identifier contained in the register RGPS1.

Likewise, in the presence of a transaction intended for the slave interface S3, the filtering logic LGCM compares the attribute of this transaction with the value of the identifier contained in the register RGPS3.

Depending on the results of these comparisons, the transaction or transactions may be rejected.

In this example embodiment, the demultiplexing stage 101 includes the two registers RGDSM2 and RGDSM3 storing respectively the fixed values of the identifiers of the programing interfaces SM2 and SM3, as well as the associated filtering logics LGS2 and LGS3.

Similarly to that which has been described above, the filtering logic LGS2 compares the attribute of a transaction intended for the programing interface SM2 with the value of the identifier contained in the register RGDSM2 in order to reject or not reject this transaction.

The filtering logic LGS3 compares the attribute of a transaction intended for the programing interface SM3 with the value of the identifier contained in the register RGDSM3 in order to decide on the possible rejection of this transaction.

The filtering circuit incorporates the various filtering logics LGS1, LGCD, LGCM, LGS2 and LGS3.

Reference is now made more particularly to FIGS. 5 to 9 to schematically illustrate an example implementation of a method for managing accesses of transactions to various items of slave equipment.

Figure 5:
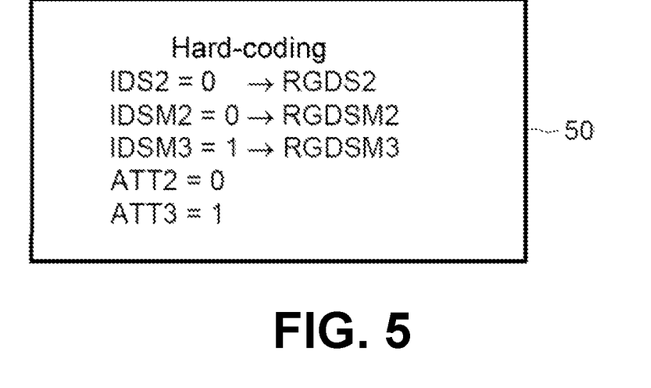
FIGS. 5-9 schematically illustrate an example implementation of a method for managing accesses of transactions to various items of slave equipment, according to an embodiment of the present invention.

As indicated previously, and as illustrated in FIG. 5, in this example, the identifiers IDS2, IDSM2 and IDSM3 associated with the items of slave equipment S2, SM2 and SM3 respectively are fixed during a hard-coding step 50 when the system-on-chip is produced and are stored in the registers RGDS2, RGDSM2 and RGDSM3 respectively.

In the example considered, the items of slave equipment S2 and SM2 are considered to be "non-isolated" and therefore have an identifier equal to "0."

The item of first master equipment M3 is considered as being capable of having access to any slave equipment, whether or not the latter is isolated.

Consequently, the identifier of the programing interface SM3 is equal to "1."

Moreover, since the item of first master equipment M3 can have access to any slave equipment, the logic incorporated in this item of equipment M3 is configured and hard-coded so as to grant to the attribute ATT3 associated with the transactions coming from this item of first master equipment M3 the value "1."

The item of second master equipment M40 also has access to any slave, whether the latter is isolated or non-isolated. The attribute ATT40 associated with the transactions coming from this item of second master equipment M40 has the hard-coded value "1."

Figure 6:
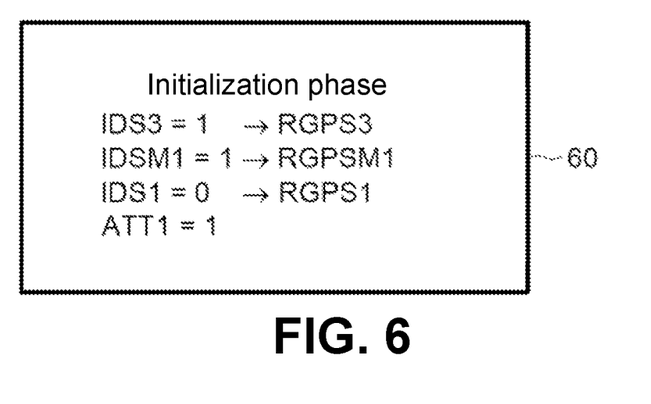

The values of the identifiers IDS1, IDS3 and IDSM1, associated with the items of slave equipment S1, S3 and SM1, respectively, are for their part programmable.

In some embodiments, this programing is advantageously performed in the initialization phase 60 during the execution of the initialization program. This programing is performed by the execution of the initialization code (programing block) MCPM contained in the item of second master equipment M40.

And, in this example, it is assumed that the slave interface S1 is chosen to be non-isolated while the slave interface S3 is chosen to be isolated.

Moreover, the programing interface SM1 associated with the item of first master equipment M1 is also chosen to be made isolated, and, as such, the item of first master equipment M1 is able to have access to any slave equipment whether it is isolated or non-isolated.

Under these conditions, the programing block MCPM grants to the identifiers IDS3 and IDSM1 the value "1" which will be stored in the registers RGPS3 and RGPSM1.

The programing block grants to the identifier IDS1, which is stored in the register RGPS1, the value "0."

Lastly, the logic LGM1 present in the item of first master equipment M1 is configured to grant to the attribute ATT1 associated with each transaction TR1 coming from this item of first master equipment M1, the value "1."

Figure 7:
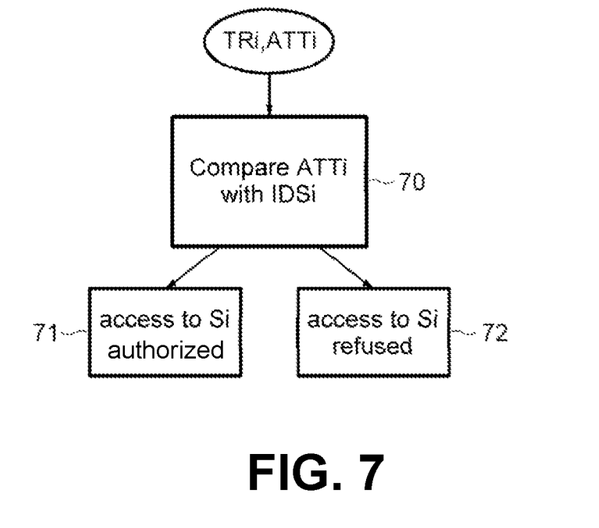

Generally, as illustrated in FIG. 7, in the presence of a transaction TRi and its attribute ATTi, the various filtering logics perform a comparison 70 between the value of the attribute ATTi and the value of the identifier IDSi of the slave interface for which this transaction is intended.

According to the result of the comparison, access to the slave interface Si is able to be authorized (step 71) or refused (step 72).

Figure 8:
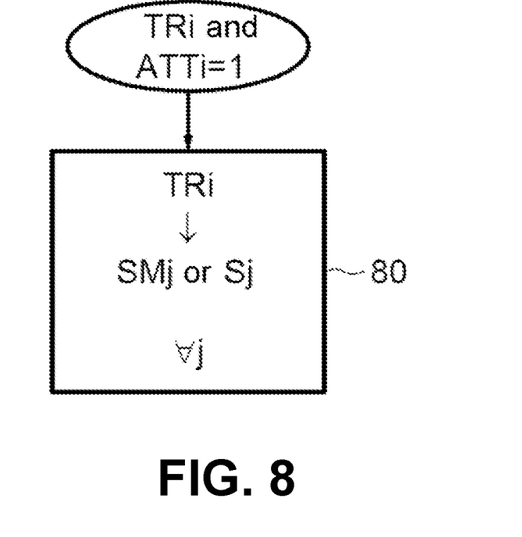

More specifically, in this implementation, as illustrated in FIG. 8, a transaction TRi associated with an attribute ATTi equal to "1" is able to be delivered to any slave equipment SMj or Sj (step 80).

Figure 9:
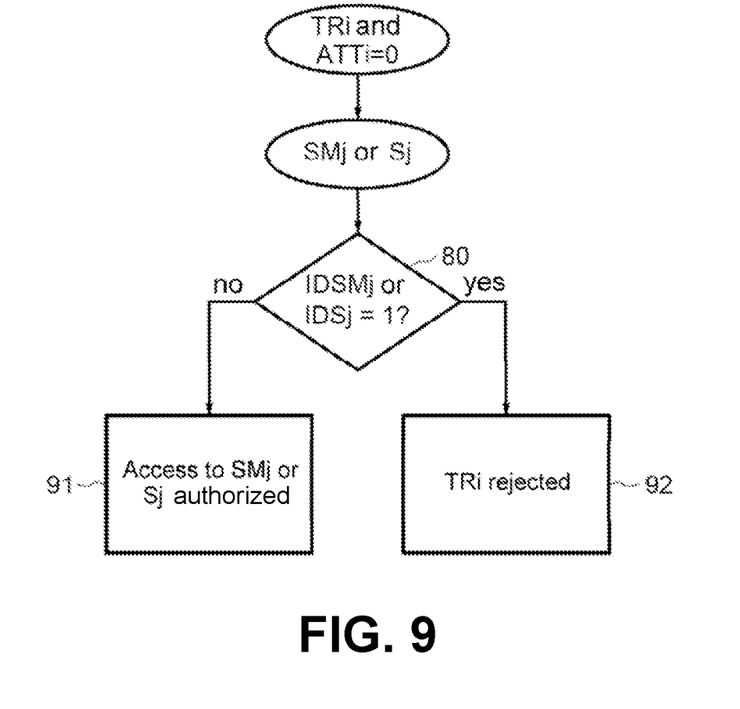

On the other hand, as illustrated in FIG. 9, a transaction TRi assigned an attribute ATTi equal to "0" and intended for an item of slave equipment SMj or Sj is able to be delivered only according to the result of the comparison between this attribute ATTi and the identifier IDSMj or IDSj of the item of slave equipment considered.

More specifically, in step 90, it is verified whether the identifier IDSMj or IDSj takes the value "1."

If that is the case, a rejection of the transaction TRi (step 92) takes place since in this case, this transaction is intended for an isolated item of slave equipment and comes from an item of master equipment which is not authorized to access isolated items of slave equipment.

However, if the identifier IDSMj or IDSj is equal to 0, then the access of the transaction is authorized (step 91).

The invention is not limited to the embodiments which have just been described but encompasses all their variants.

Thus, it would be possible to increase the number of programmable registers so as to for example make the values of all the identifiers of all the items of slave equipment programmable through of course an increase in the number of "wired" connections CX.

Moreover, it would also be conceivable, as regards the programmable values of the programing interface or interfaces SMi, to replace the wired connection CX by a command via the demultiplexing stage 101 and unused and available signals of the buses BSS8 and BSS4-BSS6.

Other variations, such as replacing logic values of "0" with logic values of "1" and vice versa, are also possible.

What is claimed is:

1. A system-on-chip comprising:
   a set of items of master equipment comprising a plurality of items of first master equipment, each item of first master equipment having a respective programming interface;
   a plurality of items of slave equipment comprising:
      slave interfaces of items of first slave equipment, and the respective programming interfaces of the plurality of items of first master equipment, wherein each respective item of slave equipment of the plurality of items of slave equipment has an associated identifier capable of taking on first and second values corresponding respectively to first and second properties of the respective item of slave equipment;
   an interconnect circuit coupled between the set of items of master equipment and the slave interfaces of the items of first slave equipment, wherein each item of master equipment of the set of items of master equipment is configured to transmit transactions to an item of slave equipment of the plurality of items of slave equipment, wherein each transaction transmitted by a respective item of first master equipment is assigned an attribute capable of taking on first and second attribute values corresponding to first and second states of the respective item of first master equipment, wherein each respective item of first master equipment of the plurality of items of first master equipment automatically inherits a property of the respective programming interface of the respective item of first master equipment, the property of the respective programming interface corresponding to the identifier associated with the respective programming interface, and wherein each respective item of first master equipment is configured to grant to the attribute assigned to the transactions transmitted by the respective item of first master equipment an attribute value according to a value of the identifier associated with the respective programming interface; and a filtering circuit configured to, in the presence of a first transaction intended for an item of slave equipment of the plurality of items of slave equipment, compare an attribute value of the first transaction with the value of the identifier associated with the intended item of slave equipment to produce a comparison result, and reject or allow the transaction according to the comparison result.

2. The system-on-chip of claim 1, wherein a value of the identifier associated with a first slave interface of the slave interfaces of the items of first slave equipment and a value of the identifier associated with a first programming interface associated with a first item of first master equipment of the plurality of items of first master equipment are programmable, the system-on-chip further comprising a programming circuit configured to program the value of the identifier associated with the first slave interface and the value of the identifier associated with the first programming interface via the interconnect circuit.

3. The system-on-chip of claim 2, wherein the programming circuit comprises:
    a first programmable register associated with the first programming interface and configured to contain the value of the identifier associated with the first programming interface;
    a second programmable register associated with the first slave interface and configured to contain the value of the identifier associated with the first slave interface;
    a programming block configured to program the first programmable register and the second programmable register via the interconnect circuit; and
    a connection link coupled between the first programmable register and the first programming interface.

4. The system-on-chip of claim 3, wherein the set of items of master equipment further comprises an item of second master equipment lacking a programming interface, the item of second master equipment coupled to the interconnect circuit, the item of second master equipment configured to grant to the attribute assigned to the transactions transmitted by the item of second master equipment a fixed value taken from among the first and second attribute values, and wherein the item of second master equipment comprises the programming block.

5. The system-on-chip of claim 3, wherein the connection link extends into the first item of first master equipment.

6. The system-on-chip of claim 3, wherein the interconnect circuit comprises an interconnect matrix coupled to the set of items of master equipment and to a stage that comprises a demultiplexer having an input coupled to an output of the interconnect matrix and a plurality of outputs coupled to the slave interfaces of the items of first slave equipment, and wherein the filtering circuit comprises a filtering logic located in the stage and coupled to the second programmable register and configured to compare the attribute value of the first transaction with the value of the identifier associated with the intended item of slave equipment to produce the comparison result.

7. The system-on-chip of claim 2, wherein the programming circuit is configured to program the value of the identifier associated with the first slave interface and the value of the identifier associated with the first programming interface during an initialization phase of the system-on-chip.

8. The system-on-chip of claim 1, wherein the set of items of master equipment further comprises an item of second master equipment lacking a programming interface, the item of second master equipment coupled to the interconnect circuit, the item of second master equipment configured to grant to the attribute assigned to the transactions transmitted by the item of second master equipment a fixed value taken from among the first and second attribute values.

9. The system-on-chip of claim 1, wherein the set of items of master equipment comprises L items, wherein L is an integer number greater than 1, wherein the first property of the respective item of slave equipment comprises permission to be accessed by M authorized items of master equipment of the set of items of master equipment, wherein M is an integer number greater or equal to 1 and lower than M, and wherein the second property of the respective item of slave equipment comprises permission to be accessed by any master equipment of the set of items of master equipment.

10. The system-on-chip of claim 9, wherein the first state of the respective item of master equipment comprises authorization to access any slave equipment, and wherein the second state of the respective item of master equipment comprises lack of authorization to access one or more items of slave equipment of the plurality of items of slave equipment.

11. The system-on-chip of claim 10, wherein:
    when the identifier associated with a first programming interface associated with a first item of first master equipment of the plurality of items of first master equipment has the first value corresponding to the first property, the attribute of a transaction coming from the first item of first master equipment has a first attribute value corresponding to the first state;
    when the identifier associated with the first programming interface has the second value corresponding to the second property, the attribute of a transaction coming from the from the first item of first master equipment has a second attribute value corresponding to the second state;
    the filtering circuit is configured to allow a transaction that has assigned an attribute having the first attribute value and is intended for any item of slave equipment of the plurality of items of slave equipment; and
    the filtering circuit is configured to reject a transaction that has assigned an attribute having the second attribute value and is intended for an item of slave equipment for which the associated identifier has the first value.

12. The system-on-chip of claim 1, wherein the first state of the respective item of master equipment comprises authorization to access any slave equipment, and wherein the second state of the respective item of master equipment comprises lack of authorization to access one or more items of slave equipment of the plurality of items of slave equipment.

13. The system-on-chip of claim 1, wherein the system-on-chip is a microcontroller.

14. A method for access management of a system-on-chip having comprising a plurality of items of master equipment and a plurality of items of slave equipment, the method comprising:
transmitting a first transaction from a first item of master equipment of the plurality of items of master equipment to a first item of slave equipment of the plurality of items of slave equipment via an interconnect circuit, wherein each respective item of slave equipment of the plurality of items of slave equipment has an associated identifier capable of taking on first and second values corresponding respectively to first and second properties of the respective item of slave equipment, wherein the plurality of items of slave equipment comprises a first programming interface associated with the first item of master equipment, wherein the first programming interface has an associated first identifier, and wherein the first item of slave equipment has an associated second identifier;
automatically inheriting, by the first item of master equipment, a property of the first programming interface, the property of the first programing interface corresponding to the first identifier;
assigning a first attribute to the first transaction, wherein the first attribute is capable of taking on first and second attribute values corresponding to first and second states of the first item of master equipment;
granting to the first attribute a first attribute value based on a value of the first identifier;
comparing the first attribute value with a value of the second identifier to produce a first comparison result; and
rejecting or allowing the first transaction based on the first comparison result.

15. The method of claim 14, further comprising programming the value of the second identifier and the value of the first identifier via the interconnect circuit.

16. The method of claim 15, wherein programming the value of the second identifier and the value of the first identifier comprises programming the value of the second identifier and the value of the first identifier during an initialization phase of the system-on-chip.

17. The method of claim 14, further comprising:
transmitting a second transaction from a second item of master equipment of the plurality of items of master equipment to the first item of slave equipment, the second item of master equipment lacking an associated programming interface;
assigning a second attribute to the second transaction, the second attribute having a second attribute value that is fixed;
comparing the second attribute value with the value of the second identifier to produce a second comparison result; and
rejecting or allowing the second transaction based on the second comparison result.

18. The method of claim 14, wherein the plurality of items of slave equipment further comprises a second item of slave equipment, wherein the first state of the first item of master equipment comprises authorization to access the first and second items of slave equipment, and wherein the second state of the first item of master equipment comprises lack of authorization access the second item of slave equipment.

19. A microcontroller comprising:
a plurality of items of master equipment comprising a first item of master equipment;
a plurality of items of slave equipment comprising a first item of slave equipment and a first programming interface associated with the first item of master equipment, wherein each respective item of slave equipment of the plurality of items of slave equipment has an associated identifier capable of taking on first and second values corresponding respectively to first and second properties of the respective item of slave equipment, wherein the first programming interface is configured to have an associated first identifier, and wherein the first item of slave equipment is configured to have an associated second identifier;
an interconnect circuit, wherein the first item of master equipment is configured to transmit a first transaction to the first item of slave equipment via the interconnect circuit, wherein the first transaction is configured to have an assigned attribute capable of taking on first and second attribute values corresponding to first and second states of the first item of master equipment, wherein the first item of master equipment automatically inherits a property of the first programming interface, the property of the first programming interface corresponding to the first identifier, and wherein the first item of master equipment is configured to grant to the attribute assigned to the first transaction a first attribute value based on a value of the first identifier; and
a filtering circuit configured to, in the presence of the first transaction, compare the first attribute value with the value of the second identifier to produce a first comparison result, and reject or allow the first transaction according to the first comparison result.

20. The microcontroller of claim 19, wherein the value of the first identifier and the value of the second identifier are programmable, the microcontroller further comprising a programming circuit configured to program the value of the first and second identifiers via the interconnect circuit.

21. The microcontroller of claim 20, wherein the programming circuit comprises:
a first programmable register associated with the first programming interface and configured to contain the value of the first identifier;
a second programmable register associated with the first item of slave equipment and configured to contain the value of the second identifier;
a programming block configured to program the first programmable register and the second programmable register via the interconnect circuit; and
a connection link coupled between the first programmable register and the first programming interface.

* * * * *